United States Patent [19]

Foster

[11] Patent Number: 4,563,167
[45] Date of Patent: * Jan. 7, 1986

[54] BELT TENSIONER AND METHOD OF MAKING THE SAME

[75] Inventor: Randy C. Foster, Springfield, Mo.

[73] Assignee: Dayco Corporation, Dayton, Ohio

[*] Notice: The portion of the term of this patent subsequent to Nov. 8, 2000 has been disclaimed.

[21] Appl. No.: 691,239

[22] Filed: Jan. 14, 1985

Related U.S. Application Data

[63] Continuation of Ser. No. 427,074, Sep. 29, 1982, abandoned, which is a continuation-in-part of Ser. No. 391,643, Jun. 25, 1982, abandoned, which is a continuation-in-part of Ser. No. 301,351, Sep. 11, 1981, Pat. No. 4,413,982.

[51] Int. Cl.$^4$ .................... F16H 7/12; F16H 7/14
[52] U.S. Cl. .................... 474/135; 474/115; 474/133
[58] Field of Search ............... 474/134, 135, 104, 110, 474/111, 131, 132, 133, 136, 137, 138, 148; 464/180; 188/290, 292, 293, 296, 306, 307

[56] References Cited

U.S. PATENT DOCUMENTS

| 30,842 | 1/1982 | Speer | 474/135 |
|---|---|---|---|
| 447,301 | 3/1891 | Dootson | 474/135 |
| 1,675,671 | 7/1928 | Stein | 474/135 |
| 1,852,755 | 4/1932 | Peo | 188/307 |
| 2,314,493 | 3/1943 | Guy | 188/89 |
| 2,629,127 | 2/1953 | Conklin et al. | 188/308 |
| 2,790,520 | 4/1957 | Kuhn, Jr. | 188/307 |
| 2,893,255 | 7/1959 | Bayliss | 188/314 |
| 3,762,229 | 10/1973 | Johnson | 474/8 |
| 4,023,660 | 5/1977 | Dickinson | 192/0.075 |
| 4,295,551 | 10/1981 | Zimmerman et al. | 192/0.076 |
| 4,418,810 | 12/1983 | Windsor | 192/0.076 |

FOREIGN PATENT DOCUMENTS

| 0072134 | 2/1983 | European Pat. Off. |  |
|---|---|---|---|
| 359936 | 9/1922 | Fed. Rep. of Germany . |  |
| 531440 | 7/1931 | Fed. Rep. of Germany . |  |
| 3225411 | 2/1983 | Fed. Rep. of Germany . |  |
| 279415 | 3/1952 | Switzerland | 474/135 |

*Primary Examiner*—Leslie A. Braun
*Assistant Examiner*—Michael D. Bednarek
*Attorney, Agent, or Firm*—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, a mechanical spring unit operatively associated with the support unit and the belt engaging unit for urging the belt engaging unit relative to the support unit and against the belt with a force to tension the belt, and a fluid dampening unit operatively associated with the support unit and the belt engaging unit to dampen the movement of the belt engaging unit relative to the support unit in at least one direction of movement thereof, the fluid dampening unit comprising a rotary dampening unit. The rotary dampening unit and the spring unit are coaxially aligned. The support unit has an opening passing therethrough for receiving a fastening member that will fasten the support unit to a vehicle bracket or the like. The opening is disposed coaxially through the rotary dampening unit and the spring unit.

6 Claims, 10 Drawing Figures

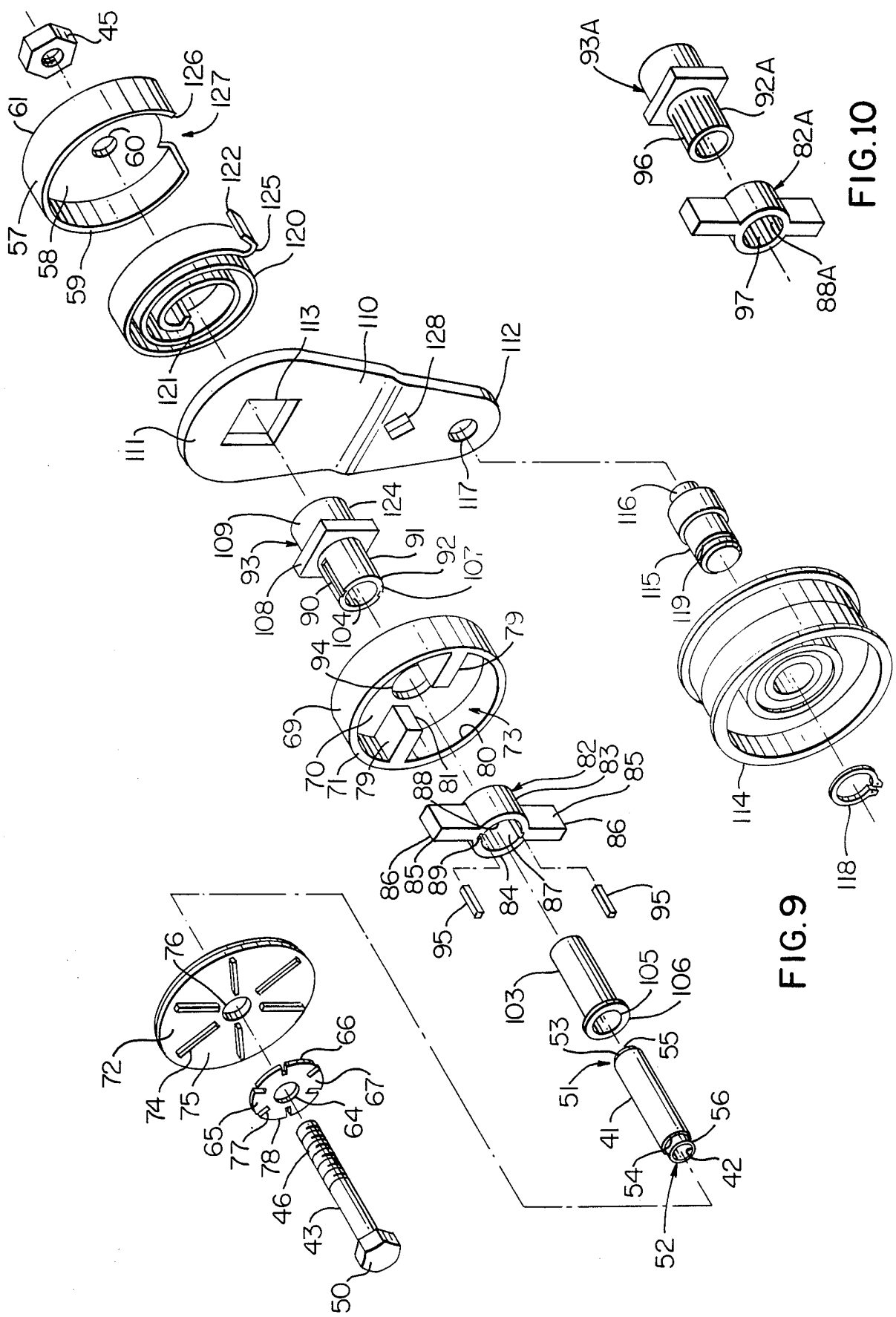

BELT TENSIONER AND METHOD OF MAKING THE SAME

CROSS REFERENCE TO RELATED APPLICATION

This application is a continuation patent application of its copending parent patent application, Ser. No. 427,074, filed Sept. 29, 1982, and now abandoned in favor of the continuation application and which, in turn, is a continuation-in-part patent application of its copending parent patent application, Ser. No. 391,643, filed June 25, 1982, now abandoned which, in turn, is a continuation-in-part patent application of its copending parent patent application, Ser. No. 301,351, filed Sept. 11, 1981, now U.S. Pat. No. 4,413,982 issued Nov. 8, 1983.

BACKGROUND OF THE INVENTION

1. Field of the Invention

This invention relates to an improved tensioner for an endless power transmission belt or the like, and to a method of making such a tensioner.

2. Prior Art Statement

It is known to applicant to provide a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof.

For example, see the copending patent application Ser. No. 296,694, filed Aug. 27, 1981 of Leslie B. Wilson, wherein the fluid dampening means comprises a cylinder means having a piston means therein and defining two chambers for fluid in the cylinder means on opposite sides of the piston means together with preferential flow control means interconnecting the two chambers together.

Also see the copending patent application Ser. No. 296,697, filed Aug. 27, 1981 of Randy C. Foster et al wherein another such tensioner is provided and the fluid dampening means thereof comprises a cylinder means having a piston means therein and defining two chambers for fluid in the cylinder means on opposite sides of the piston means with the spring means being disposed in one of those chambers.

It is also known to provide a belt tensioner with a friction surface dampening means of the solid type utilized to tend to dampen vibrations and the like that are imposed on the belt tensioner.

It is also known to provide fluid couplings, such as torque converters, wherein rotational movement of one member causes rotational movement of another member because a fluid translates such movement between the two members, each member having vanes thereon.

It is also known to secure a belt tensioner to a vehicle bracket by a single bolt passing through an opening in the support means of the tensioner so that the tensioner can be mounted from the front side thereof. For example see the U.S. Pat. No. 4,270,906 to Kraft et al.

SUMMARY OF THE INVENTION

It is one feature of this invention to provide an improved tensioner for a power transmission belt or the like.

In particular, it was found according to the teachings of the invention in the copending parent patent application, Ser. No. 301,351, filed Nov. 11, 1981, that a relatively small and compact belt tensioner could be provided by uniquely arranging the mechanical spring means thereof and the fluid dampening means thereof in a manner believed to be more compact than the arrangements set forth in the aforementioned copending patent applications, Ser. No. 296,694, filed Aug. 27, 1981, of Leslie B. Wilson and Ser. No. 296,697, filed Aug. 27, 1981, of Randy C. Foster et al, both of these copending patent applications being hereby incorporated into this disclosure by this reference thereto.

In particular, it was found according to the teachings of that invention that the spring means of a belt tensioner can comprise a pair of springs disposed in substantially parallel spaced relation with the fluid dampening means having at least a part thereof disposed between the springs in substantially parallel relation therewith to render the belt tensioner substantially small and compact.

For example, one embodiment of that invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof, the mechanical spring means comprising a pair of springs disposed in substantially parallel spaced relation with the fluid dampening means having at least a part thereof disposed between the springs and in substantially parallel relation therewith.

It is another feature of that invention to provide an improved fluid dampening means for a belt tensioner or the like.

In particular, it was found according to the teachings of that invention that the fluid dampening means for a belt tensioner could comprise a rotary dampening means.

For example, another embodiment of that invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof, the fluid dampening means comprising a rotary dampening means.

It was found according to the teachings of the invention in the copending parent application, Ser. No. 391,643, filed June 25, 1982, that the previously described tensioner could have the rotary dampening means and the spring means coaxially aligned to render the tensioner relatively small and compact.

For example, one embodiment of that invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and fluid dampening means operatively associated with the support means and the belt engaging means to dampen the movement of the belt engaging means relative to the support means in at least one direction of movement thereof, the fluid dampening means comprising a rotary dampening means. The dampening means and the spring means are coaxially aligned.

However, it is found according to the teachings of this invention that the previously described tensioner could be modified to permit the same to be mounted to a vehicle bracket by a single bolt passing through an opening means in the support means of the tensioner so that the tensioner can be mounted from the front side thereof in a simple and effective manner.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and dampening means operatively associated with the support means and the belt engaging means to dampen the movement of the belt engaging means relative to the support means, the dampening means having a movable means and a longitudinal axis on which the movable means moves. The spring means has a longitudinal axis and is spiraled about the axis thereof. The support means comprises a shaft means having a longitudinal axis and is fixed from movement relative to the belt engaging means, the shaft means carrying the dampening means and the spring means in spaced apart side-by-side relation thereon with the axis of the shaft means being substantially coaxial with the axes of the dampening means and the spring means whereby the dampening means and the spring means are coaxially spaced apart and are coaxially aligned by the shaft means. The belt engaging means has a portion thereof disposed between the dampening means and the spring means and is rotatably carried by the shaft means so as to rotate relative to the shaft means whereby the dampening means and the spring means are coaxially spaced from each other by the portion of the belt engaging means. The shaft means has an opening means passing therethrough for receiving a fastening member that will fasten the support means to a bracket or the like, the opening means being disposed coaxially through the dampening means and the spring means.

Accordingly, it is an object of this invention to provide an improved tensioner for a power transmission belt or the like that is adapted to be operated in an endless path, the tensioner of this invention having one or more of the novel features of this invention as set forth above or hereinafter shown or described.

Another object of this invention is to provide an improved method of making a tensioner for a power transmission belt or the like that is adapted to be operated in an endless path, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 9 is an exploded isometric view of the various parts of the belt tensioner of FIGS. 3-8.

FIG. 10 is an exploded isometric view of another embodiment of two parts of the tensioner of FIG. 9.

Figure 1:
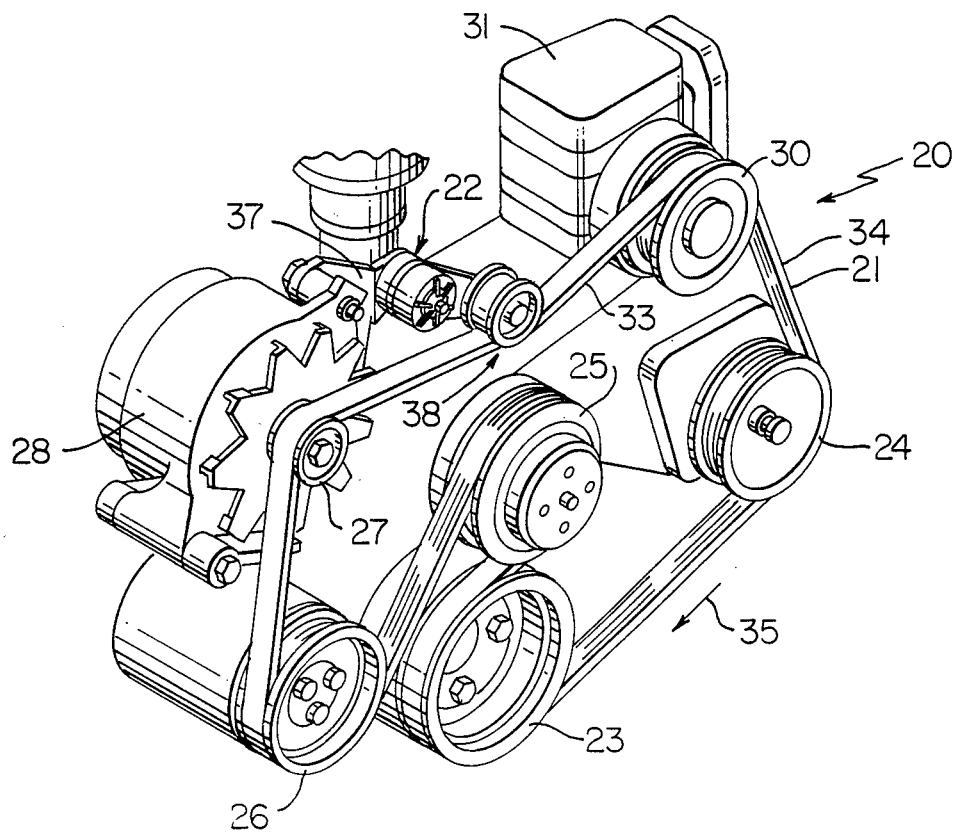
FIG. 1 is a fragmentary isometric view looking toward the front end of an automobile engine which utilizes the belt tensioner of this invention.

DESCRIPTION OF THE PREFERRED
EMBODIMENTS

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiments illustrated in the drawings, because the drawings are merely utilized to illustrate one of the wide variety of uses of this invention.

Figure 2:
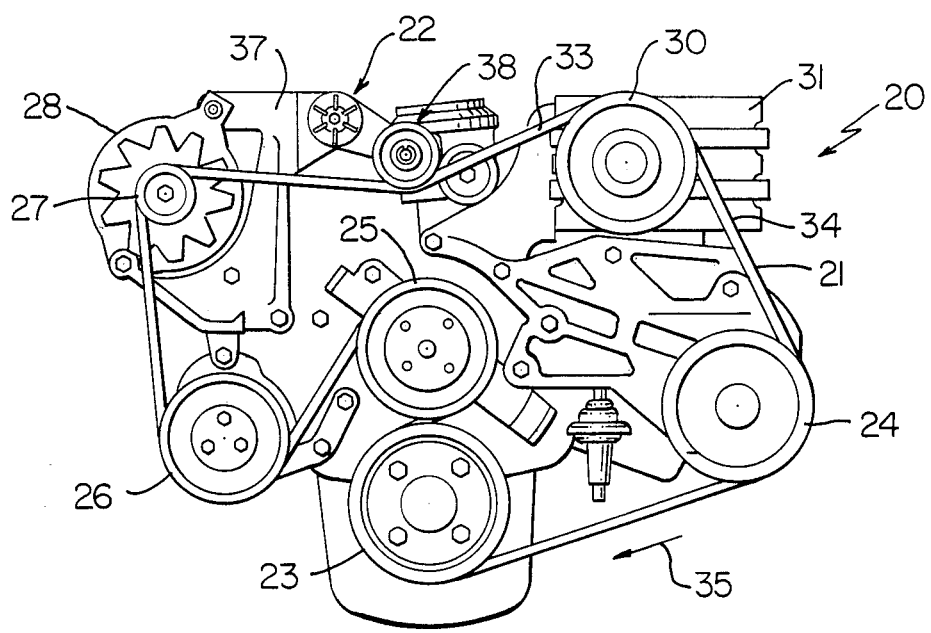
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permit the tensioner 22 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in application where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produce variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 4:
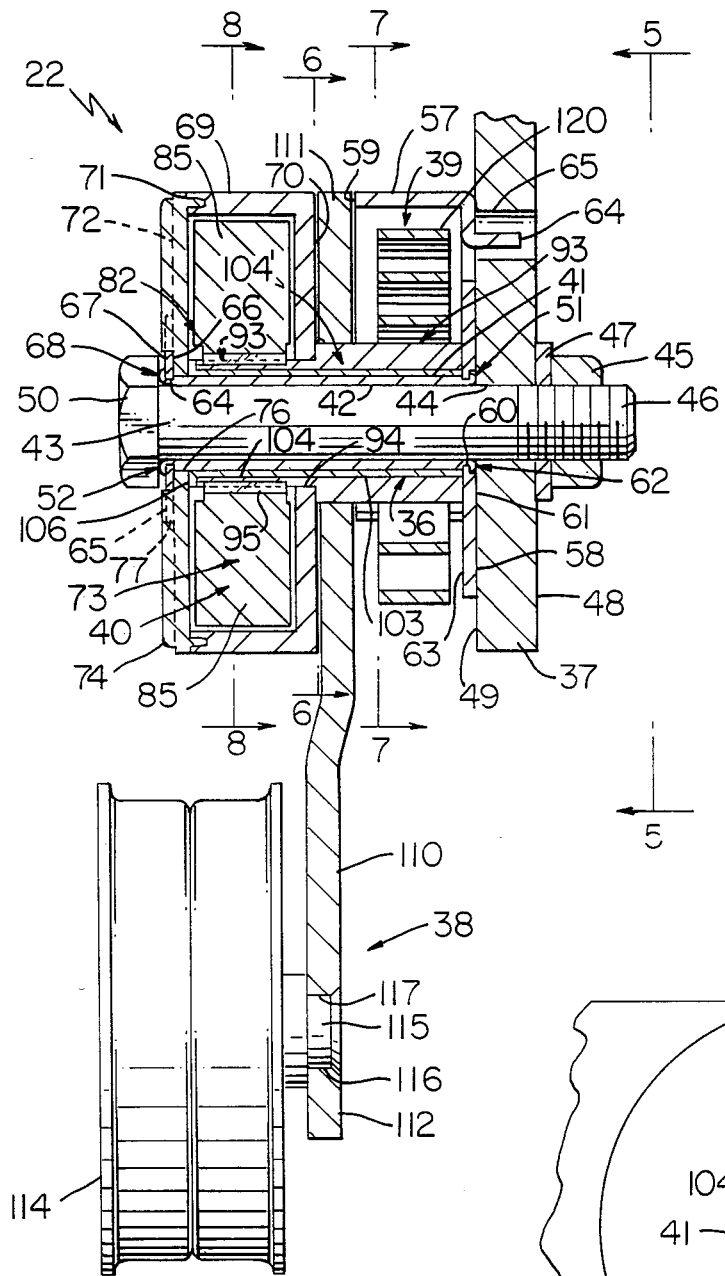
FIG. 4 is a fragmentary cross-sectional view of the belt tensioner of FIG. 3 and is taken on line 4—4 of FIG. 3.
Figure 6:
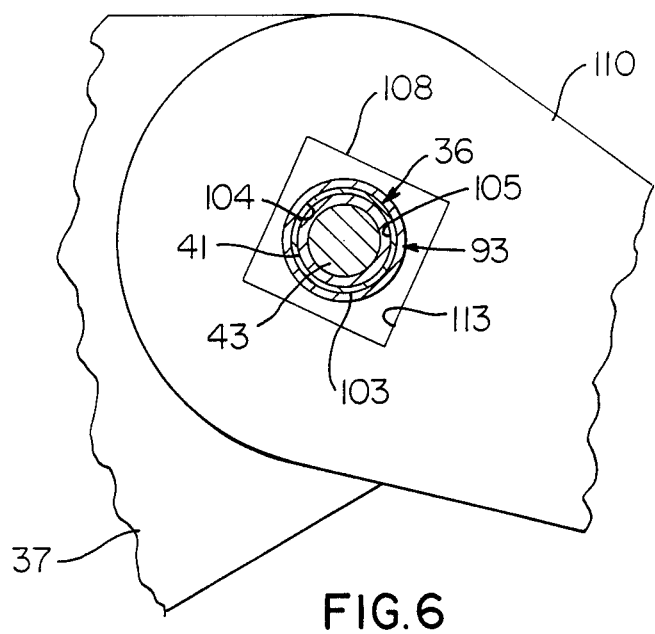
FIG. 6 is a fragmentary cross-sectional view taken on line 6—6 of FIG. 4.

As best illustrated in FIG. 4, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 is a manner hereinafter set forth.

The fluid dampening means 40 and spring means 39 are coaxially aligned and the support means 36 includes a tubular member 41 that has a cylindrical opening 42 passing completely therethrough to receive a fastening bolt 43 that is adapted to fasten the tensioner 22 to the bracket 37 by passing through an opening 44 in the bracket 37 and having a nut 45 threaded on the threaded end 46 thereof to compact a washer 47 against the rear side 48 of the bracket 37 while one end 51 of the tubular member 41 is being compacted against the front side 49 of the bracket 37 by the enlarged head 50 of the bolt or fastening member 43 engaging against the other end 52 of the tubular member 41.

In this manner, the tensioner 22 of this invention is adapted to be mounted to the bracket 37 by the single bolt 43 that is inserted through the fastening opening 42 at the front of the tensioner 22, the fastening opening 42 being coaxially disposed through the coaxially aligned fluid dampening means 40 and spring means 39 to render the tensioner 22 relatively small and compact.

As best illustrated in FIG. 9, the tubular member 41 has the opposed ends 51 and 52 thereof respectively defining annular shoulders 53 and 54 with reduced portions 55 and 56 respectively extending from the shoulders 53 and 54 as illustrated.

A cup-shaped housing member 57 has a closed end 58 and an open end 59, the closed end 58 having an opening 60 passing therethrough and being adapted to receive the reduced portion 55 of the end 51 of the tubular member 41 therethrough so that the reduced end 55 can be subsequently turned over or staked to the side 61 of the housing 57, the staked portion of the end 51 of the tubular member 41 being indicated by the reference numeral 62 whereby the housing 57 has its side 63 held against the shoulder 53 of the tubular member 41 by the staking 62 so that the housing 57 is fixed to the tubular member 41 and defines part of the support means 36 of the tensioner 22 of this invention as will be apparent hereinafter.

When the tensioner 22 is subsequently mounted to the vehicle bracket 37 by the single fastening member or bolt 43 in the manner previously described, rotation of the support means 36 relative to the bracket 37 is prevented by a tang 64 that had been carved from the closed end 58 of the housing 57 and that projects into a suitable locating opening 65 in the bracket 37 as illustrated in FIG. 4 whereby the housing 57 is prevented from rotating relative to the bracket 37 and, thus, prevents the tubular member 41 from rotating thereto as the tubular member 41 is fastened to the housing 57 by the aforementioned staking 62.

The other reduced end 56 of the tubular member 41 is adapted to be telescopically received in an opening 64 of a washer-like member 65 that is adapted to have the side 66 thereof disposed against the shoulder 54 while the reduced portion 56 of the tubular member 41 is adapted to be turned over or staked against the side 67 thereof, such staking being indicated by the reference numeral 68 whereby the washer-like member 65 is adapted to be fastened to the tubular member 41 and thereby be non-rotatable relative thereto. The washer-like member 65 thereby becomes part of the support means 36 of the tensioner 22 and is adapted to prevent rotation of an outer ring member 69 of the fluid dampening means 40 in a manner hereinafter set forth.

The fluid dampening means 40 includes the outer ring member 69 which comprises a cup-shaped member having a closed end 70 and an open end 71, the open end 71 of the casing 69 or outer ring member 69 being adapted to be closed by a cover member 72 secured thereto in any suitable manner. For example, should the outer ring member 69 and the cover member 72 comprise plastic material, the same can be ultrasonically welded together in a manner well known in the art to define a chamber 73 within the outer ring member 69 for a purpose hereinafter described. In any event, once the cover 72 is secured to the cup shaped outer ring member 69, the cover 72 cannot move relative to the outer ring member 69.

The cover 72 of the fluid dampening means 40 has a plurality of outwardly projecting and radially disposed ribs or projections 74 on the outside surface 75 thereof and substantially radiating from a central opening 76 passing through the cover member 72.

After the rotary dampening means 40 has been assembled on the tubular member 41 in a manner hereinafter set forth and before the washer-like member 65 has been secured to the end 52 of the tubular member 41, the washer-like member 65 is then staked to the end 52 of the tubular member 41 and since the washer-like member 65 has a plurality of radially disposed slots 77 formed in the outer periphery 78 thereof as illustrated in the drawings, the slots 77 each receive a rib or projection 74 of the cover member 72 therein. Thus, now that the washer-like member 65 is secured to the tubular member 41 by the staking 68, the outer ring member 69 through the cover 72 thereof is likewise secured to the tubular member 41 so that the outer ring member 69 of the fluid dampening means 40 is held stationary by the support means 36 of the tensioner 22.

The outer ring member 69 of the fluid dampening means 40 has a pair of diametrically disposed vanes 79 extending radially inwardly from the internal cylindrical peripheral surface 80 of the outer ring member 69, the vanes 79 respectively being provided with free ends 81 for a purpose hereinafter described.

An inner ring member 82 is adapted to be disposed in the chamber 73 of the outer ring member 69 and comprises a tubular portion 83 having a substantially cylindrical outer peripheral surface 84 and a pair of diametrically disposed vanes 85 radiating outwardly therefrom, each vane 85 being provided with an outer free end 86.

The tubular portion 83 of the inner ring member 82 has a cylindrical opening 87 passing therethrough and defining an internal peripheral surface 88 thereof that is interrupted by a pair of diametrically disposed key-way slots 89 adapted to register with like key-way slots 90 formed in the outer peripheral cylindrical surface 91 of a projection 92 of an arbor sleeve or member 93 adapted to not only project into the opening 87 of the inner ring member 82 but also to pass through a central opening 94 formed through the closed end 70 of the outer ring member 69. In this manner, the inner ring member 82 will be mounted concentrically within the chamber 73 of the outer ring member 69, the projection 92 of the arbor sleeve 93 being fastened to the inner ring member 82 so as to rotate in unison therewith by suitable key-way members 95 being disposed in the registering key-way slots 89 and 90 of the inner ring member 82 and arbor sleeve 93.

However, it is to be understood that the inner ring member 82 can be interconnected to the projection 91 of the arbor sleeve 93 in any other desired manner.

For example, reference is now made to FIG. 10 wherein another arbor sleeve of this invention is generally indicated by the reference numeral 93A and parts thereof similar to the arbor sleeve 93 previously described are indicated by like reference numerals followed by the reference letter "A".

As illustrated in FIG. 10, it can be seen that the projection 92A of the arbor sleeve 93A has a plurality of longitudinally disposed splines or ribs 96 formed on the outer peripheral surface 91A thereof which are adapted to respectively register with longitudinally disposed splines or grooves 97 formed in the internal peripheral surface 88A of the inner ring member 82A illustrated in FIG. 10.

In any event, it can be seen that the inner ring member 82 is fixed to the arbor sleeve 93 so as to rotate in unison therewith and since the outer ring member 69 is held from rotation by the support means 36, the inner ring member 82 is adapted to move relative thereto.

Figure 8:
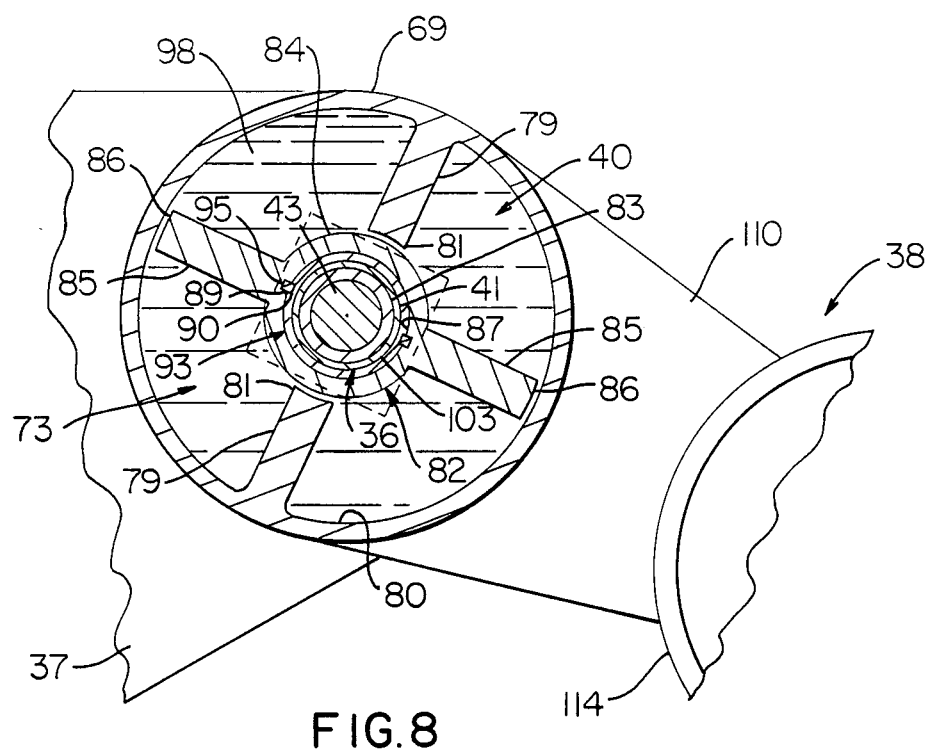
FIG. 8 is a fragmentary cross-sectional view taken on line 8—8 of FIG. 4.

As illustrated in FIG. 8, the inner ring member 82 has its vanes 85 disposed intermediate the vanes 79 of the outer ring member 69 and when the chamber 73 is filled with a suitable fluid, such as suitable hydraulic oil, grease or other suitable fluid medium, any rotation of the inner ring member 82 relative to the outer ring member 69 will cause its vanes 85 to act on the fluid, indicated by the reference numeral 98 in FIG. 8 to tend to retard such movement whereby the rotary dampening means 40 of this invention will provide a dampening effect on the movement of the belt engaging means 38 relative to the belt 21 in a manner hereinafter set forth and as fully set forth in applicant's parent copending patent applications, Ser. No. 391,643, filed June 25, 1982 and Ser. No. 301,351, filed Sept. 11, 1981.

In order to control the amount of fluid flow past the vanes 85 and 79 of the inner ring member 82 and outer ring member 69 during the aforementioned movement of the inner ring member 82 relative to the outer ring member 69, the free ends 81 of the vanes 79 can be disposed closely adjacent the outer cylindrical surface 84 of the inner ring member 82 while the outer ends 86 of the vanes 85 of the inner ring member 82 can be disposed closely adjacent the internal peripheral surface 80 of the outer ring member 69.

A bearing-like tubular sleeve 103 is adapted to be press-fitted into a cylindrical opening 104 passing through the arbor sleeve 93 so that the tubular sleeve 103 will rotate in unison with the arbor sleeve 93 and cooperate therewith to define a sleeve means of this invention that is generally indicated by the reference numeral 104′ in FIG. 4, the sleeve means 104′ being utilized to rotatably mount the inner ring member 82 on the tubular member 41 of the support means 36.

In particular, the sleeve 103 has an opening 105 passing therethrough and is thereby adapted to be telescopically disposed on the tubular member 41 intermediate its ends 51 and 52, the sleeve 103 having an enlarged flange-like end 106 adapted to bear against the end 107 of the projection 91 of the arbor sleeve 93 when the same has been press-fitted therein.

In this manner, the sleeve 103 provides a bearing means on the stationary tubular member 41 as will be apparent hereinafter.

The arbor sleeve 93 has an intermediate rectangular portion 108 and an outer cylindrical portion 109 with the portions 108 and 109 respectively forming part of the belt engaging means 38 and the spring means 39.

In particular, the belt engaging means 38 includes an arm 110 having opposed ends 111 and 112, the end 111 having a rectangular opening 113 passing therethrough and receiving the rectangular intermediate section 108 of the arbor sleeve 93 therein so that the arm 110 and arbor sleeve 93 are effectively interconnected together so that the same will rotate in unison. The other end 112 of the arm 110 carries a rotatable pulley 114 that is rotatably mounted on a shaft 115 having a reduced end 116 fixed in an opening 117 in the end 112 of the arm 110 in any suitable manner, the pulley 114 being held on the shaft 115 by a suitable C-ring 118 being received in an annular groove 119 in the shaft 115 so that the pulley 114 is confined for rotation on the shaft 115 between the C-ring 118 and the end 112 of the arm 110.

In this manner, movement of the pulley 114 through the positions illustrated in FIG. 3 will cause the arm 110 to move therewith and thereby cause rotation of the arbor sleeve 93 which in turn causes rotation of the inner ring member 82 of the fluid dampening means 40 to provide a dampening force on such movement of the pulley 114 as will be apparent hereinafter.

Figure 7:
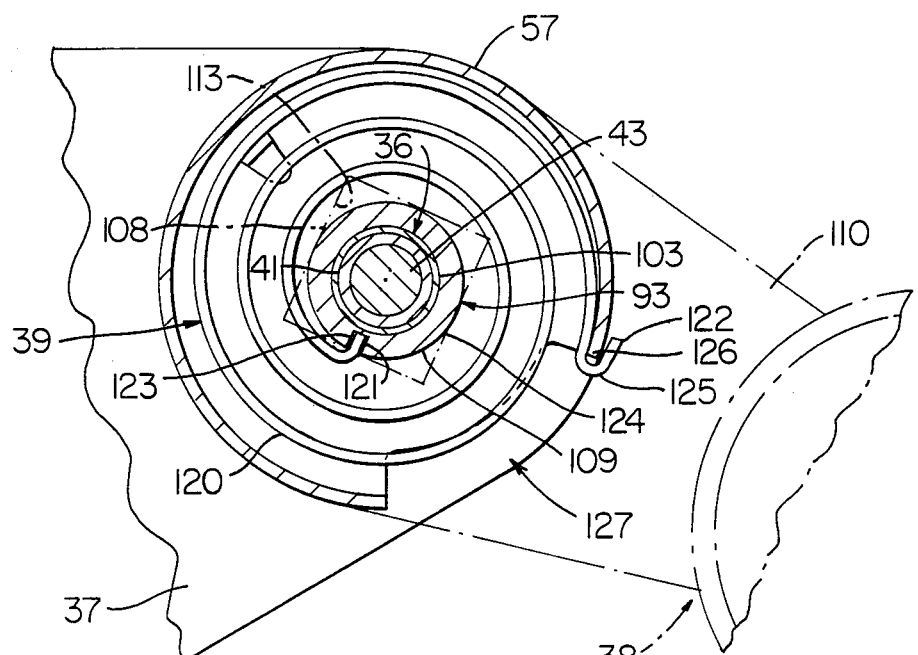
FIG. 7 is a fragmentary cross-sectional view of the tensioner of FIG. 4 and is taken on line 7—7 of FIG. 4.

The spring means 39 of the tensioner 22 of this invention comprises a coiled torsion spring 120 having opposed inner and outer ends 121 and 122. The inner end 121 of the coiled torsion spring 120 is adapted to be received in a slot 123 formed in the outer peripheral surface 124 of the portion 109 of the arbor sleeve 93 as illustrated in FIG. 7 while the outer end 122 of the torsion spring 120 is formed in a hook shape so that the resulting hook 125 thereof hooks over the edge 126 of the housing 57 at an opening means 127 thereof.

Figure 3:
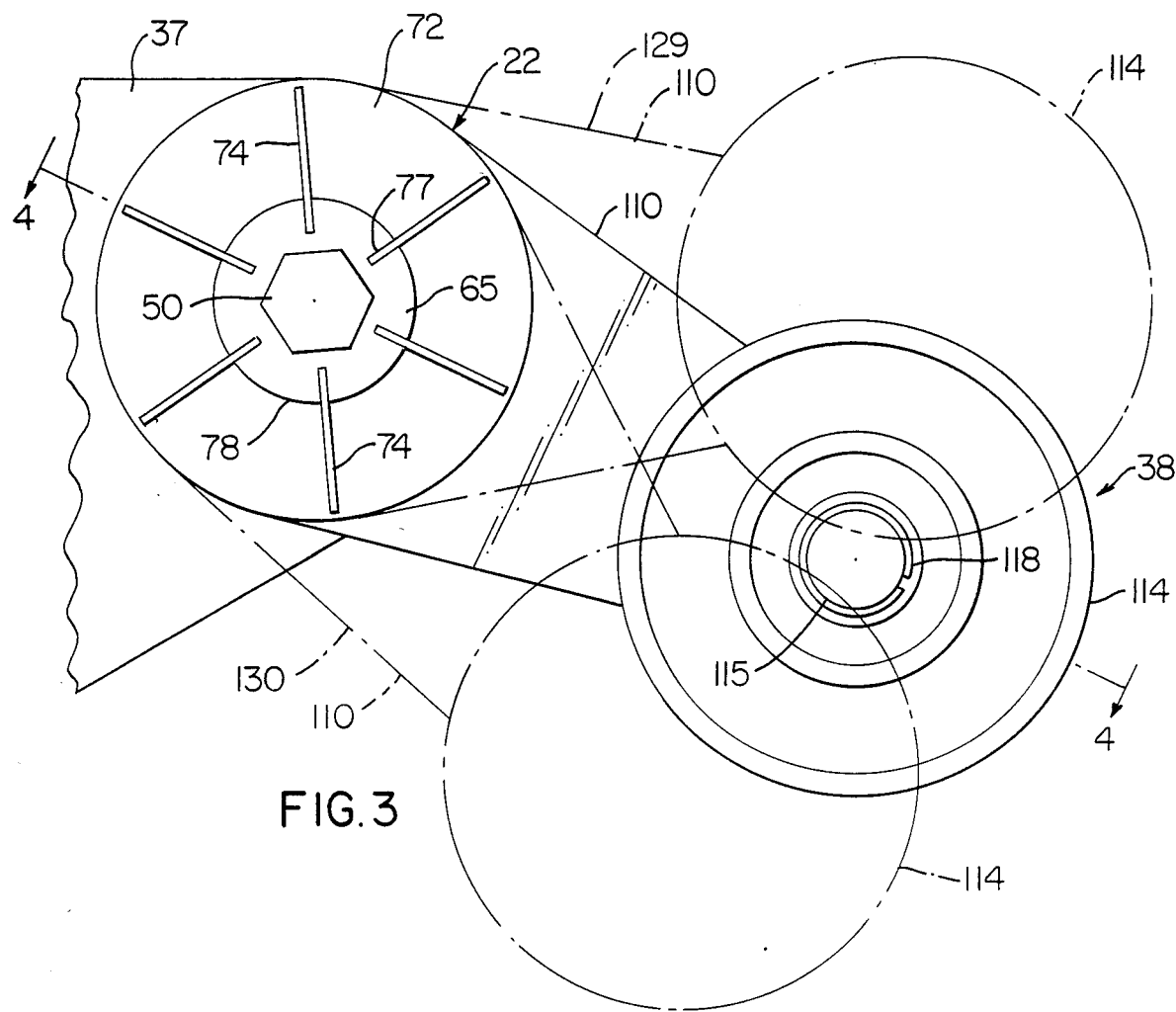
FIG. 3 is an enlarged fragmentary front view of the belt tensioner of this invention that is being utilized for tensioning the power transmission belt of FIGS. 1 and 2 and illustrates various positions thereof.
Figure 5:
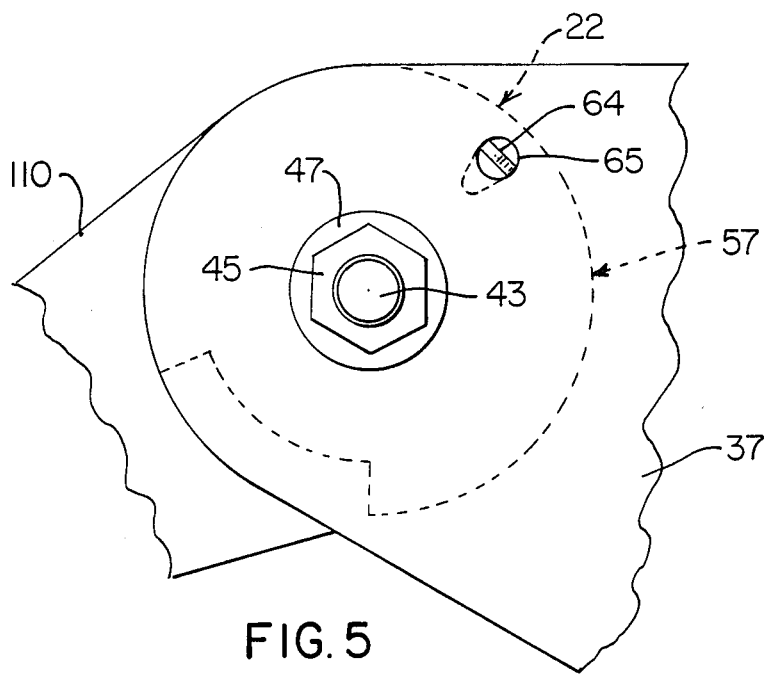
FIG. 5 is a fragmentary rear view of the belt tensioner of FIG. 4 and is taken in the direction of the arrows 5—5 of FIG. 4.

The torsion spring 120 is so arranged in the housing 57 of the tensioner 22, that the spring 120 has a force tending to move the arbor sleeve 93 in a direction to tend to cause the arm 110 to move the pulley 114 in a clockwise direction from the positions of the arm 110 illustrated in FIG. 3 whereby when the pulley 114 is disposed in any of the positions illustrated in FIG. 3, the torsion spring 120 is wound up so that the spring 120 is still tending to move the pulley wheel 114 in a clockwise direction and is thereby applying tensioning force on the belt 21 that is engaged by the pulley 114.

While the various parts of the tensioner 22 previously described can be formed of any suitable materials, the same, except for the sealing members 100 and 102, can be formed of metal if desired.

When the fluid dampening means 40 is being assembled onto the portion 91 of the arbor sleeve 93, the end wall 70 of the outer ring member 69 abuts against the intermediate rectangular portion 108 of the arbor sleeve 93 as illustrated in FIG. 4 and since the closed end wall 58 of the housing 57 abuts against the portion 109 of the arbor sleeve 93, the arm 110 at the end 111 thereof will be positioned on the rectangular intermediate portion 108 of the arbor sleeve 93 in a manner to be sufficiently spaced from the end wall 70 of the outer ring member 69 and the open end 59 of the housing 57 so that the arm 110 is adapted to rotate relative thereto by the clearance provided therebetween as illustrated in FIG. 4. Thus, the outer ring member 69 and housing 57 do not impede the rotational movement of the arm 110 and, thus, rotational movement of the arbor sleeve 93.

Accordingly, it can be seen that it is a relatively simple matter to make the tensioner 22 of this invention by the method of this invention previously described from the various parts thereof to operate in a manner now to be described.

When it is desired to mount the tensioner 22 of this invention to the engine 20, the tensioner 22 is placed adjacent the bracket 37 with the spring means 39 having the arm 110 in such a position that the pulley 114 is disposed in a position that the arm 110 will have to be rotated in a counterclockwise direction in FIG. 3 in order to place the pulley 114 on the belt 21. The tensioner 22 is so disposed against the bracket 37 that the projection 64 of the housing 57 is received in the opening 65 in the bracket 37. At this time, the fastening member or bolt 43 is inserted through the opening 42 in the tubular member 41 to project through the opening 44 in the bracket 37 and have the nut 45 threaded on the threaded end 46 thereof to compact the tensioner 22 between the head 50 of the bolt 43 and the side 49 of the bracket 37 in the manner previously described so that the support means 36 of the tensioner 22 is fixed to the bracket 37 and thereby fixed relative to the belt 21.

Thereafter, the pulley 114 and arm 110 are rotated in a counterclockwise direction in FIG. 3 so as to place the pulley 114 onto the belt 21 as illustrated in FIGS. 1 and 2 and as illustrated by the intermediate full line position in FIG. 3 so that the torsion spring 120 is wound up and is tending to urge the pulley 114 in a clockwise direction against the belt 21, such adjustment of the pulley 114 onto the belt 21 being facilitated by a suitable tool being inserted into a rectangular opening 128 formed in the arm 110 so that the arm 110 can be rotated to place the pulley 114 onto the belt 21 in opposition to the force of the torsion spring 120.

Accordingly, in all operating positions of the arm 110 of the belt engaging means 38 as represented by the full lines and phantom lines 129 and 130 in FIG. 3 of the drawings, the torsion spring 120 has a force tending to move the belt engaging means 38 in a clockwise direction beyond the position 130 so as to always provide a tensioning force on the belt 21.

Thus, assuming that the belt engaging means 38 is in the full line position illustrated in FIG. 3 against the belt 21 and a normal oscillation of the belt 21 during the operation of the engine 20 for the reasons previously set forth causes the belt engaging means 38 to move further inwardly toward the belt 21 in a clockwise direction in FIG. 3, such clockwise movement of the arm 110 causes the arbor sleeve 93 and, thus, the inner ring member 82 of the fluid dampening means 40 to rotate in a clockwise direction in FIG. 8 whereby the action of the vanes 85 and 79 on the fluid 98 in the chamber 73 of the rotary dampening means 40 tends to retard such rotary movement of the inner ring member 82 relative to the stationary outer ring member 69 for the reasons previously decribed so as to dampen the movement of the belt engaging means 38 toward the belt 21. Conversely, should the fluctuation of the belt 21 cause the belt engaging means 38 to move in a counterclockwise direction away from the belt 21 as illustrated in FIG. 3, such movement of the arm 110 causes the inner ring member 82 of the rotary dampening means 40 to move in a counterclockwise direction in FIG. 8 whereby the fluid 98 in the chamber 73 of the rotary dampening means 40 tends to retard such movement of the inner ring member 82 so as to dampen such oscillation of the belt 21 for the reasons previously set forth.

Therefore, it can be seen that the tensioner 22 provides for fluid dampening of the movement of the belt engaging means 38 relative to the support means 36 so as to tend to prevent early wearout of the mechanical spring means 39 that is operatively interconnected to the support means 36 and the belt engaging means 38 for the reasons previously set forth.

Also, it can be seen that since the rotary dampening means 40 and mechanical spring means 39 of the tensioner 22 of this invention are coaxially aligned, the same render the tensioner 22 substantially small and compact while still permitting the single fastening member 43 to secure the tensioner 22 to the bracket 37 in the manner previously set forth.

Thus, it can be seen that this invention not only provides an improved belt tensioner, but also this invention provides an improved method of making such a belt tensioner.

While the forms and methods of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and dampening means operatively associated with said support means and said belt engaging means to dampen the movement of said belt engaging means relative to said support means, said dampening means having a movable means and a longitudinal axis on which said movable means moves, said spring means having a longitudinal axis and being spiraled about said axis thereof, said support means comprising a shaft means having a longitudinal axis and being fixed from movement relative to said belt engaging means, the improvement wherein said shaft means carries said dampening means and said spring means in spaced apart side-by-side relation thereon with said axis of said shaft means being substantially coaxial with said axes of said dampening means and said spring means whereby said dampening means and said spring means are coaxially spaced apart and are coaxially aligned by said shaft means, said belt engaging means having a portion thereof disposed between said dampening means and said spring means and being rotatably carried by said shaft means so as to rotate relative to said shaft means whereby said dampening means and said spring means are coaxially spaced apart from each other by said portion of said belt engaging means, said shaft means having an opening means passing therethrough for receiving a fastening member that will fasten said support means to a bracket or the like, said opening means being disposed coaxially through said dampening means and said spring means, said shaft means comprising a tubular member disposed coaxially through said dampening means and said spring means, said tubular member having opposed open ends whereby said tubular member defines said opening means that passes completely therethrough, a sleeve means rotatably disposed on said tubular member, said belt engaging means comprising an arm having opposed ends, one of said opposed ends of said arm being interconnected to said sleeve means to rotate in unison therewith, said belt engaging means further comprising a pulley for engaging said belt, said pulley being rotatably carried by the other of said opposed ends of said arm, said spring means comprising a coiled torsion spring having an inner end and an outer end, said inner end of said spring being operatively interconnected to said sleeve means and said outer end of said spring being operatively interconnected to said tubular member, and a cup-shaped housing having a closed end and an open end, said closed end of said housing being secured to one of said ends of said tubular member and said open end of said housing being disposed closely adjacent said one end of said arm to be effectively closed thereby, said spring being disposed in said housing, said outer end of said spring being operatively interconnected to said housing.

2. A tensioner as set forth in claim 1 wherein said dampening means comprises a rotary dampening means having an outer ring member and an inner ring member disposed in said outer ring member, said members being arranged for relative rotational movement therebetween, said outer ring member being operatively interconnected to said support means, said inner ring member being operatively interconnected to said belt engaging means and being said movable means of said dampening means.

3. A tensioner as set forth in claim 2 wherein said inner ring member has a plurality of circumferentially spaced apart radially outwardly disposed vane means, said outer ring member having a plurality of circumferentially spaced apart radially inwardly disposed vane means cooperating with said vane means of said inner ring member to restrict relative rotational movement between said members in at least one direction.

4. A tensioner as set forth in claim 1 wherein said outer ring member is interconnected to the other end of said tubular member.

5. A tensioner as set forth in claim 1 wherein said inner ring member is rotatably disposed on said tubular member.

6. A tensioner as set forth in claim 5 wherein said inner ring member is operatively interconnected to said sleeve means to rotate in unison therewith relative to said tubular member.

* * * * *